(12) United States Patent
Endo

(10) Patent No.: US 6,825,472 B2
(45) Date of Patent: Nov. 30, 2004

(54) RADIATION IMAGING SYSTEM

(75) Inventor: Takashi Endo, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 163 days.

(21) Appl. No.: 09/887,121

(22) Filed: Jun. 25, 2001

(65) Prior Publication Data

US 2002/0014594 A1 Feb. 7, 2002

(30) Foreign Application Priority Data

Jun. 27, 2000 (JP) .......................................... 2000-193340

(51) Int. Cl.$^7$ ................................................ G01T 1/24
(52) U.S. Cl. ............................ 250/370.09; 250/370.01; 250/336.1; 250/367
(58) Field of Search ........................ 250/370.09, 370.01, 250/336.1, 367

(56) References Cited

U.S. PATENT DOCUMENTS

| | | | |
|---|---|---|---|
| 4,277,804 A | | 7/1981 | Robison ..................... 358/108 |
| 4,567,543 A | * | 1/1986 | Miniet ..................... 361/370.09 |
| 4,763,346 A | | 8/1988 | Niedospial et al. ......... 378/187 |
| 4,900,937 A | * | 2/1990 | Dayton et al. ............. 250/483.1 |
| 5,031,198 A | * | 7/1991 | Deucher et al. ............... 378/4 |
| 5,043,582 A | | 8/1991 | Cox et al. .............. 250/370.09 |
| 5,198,685 A | | 3/1993 | Kitani et al. ................ 257/82 |
| 5,283,439 A | * | 2/1994 | Bouissou et al. ........... 250/368 |
| 5,381,014 A | | 1/1995 | Jeromin et al. ......... 250/370.09 |
| 5,464,984 A | | 11/1995 | Cox et al. .............. 250/370.11 |
| 5,661,309 A | | 8/1997 | Jeromin et al. ............. 250/580 |
| 5,773,839 A | | 6/1998 | Krepel et al. ............... 250/580 |
| 5,796,109 A | * | 8/1998 | Frederick et al. ........... 250/368 |
| 5,804,832 A | * | 9/1998 | Crowell et al. ............. 250/580 |
| 5,869,836 A | * | 2/1999 | Linden et al. .......... 250/361 R |
| 6,211,626 B1 | * | 4/2001 | Lys et al. .................... 315/291 |
| 2002/0005490 A1 | * | 1/2002 | Watanabe .............. 250/370.09 |

FOREIGN PATENT DOCUMENTS

| | | | |
|---|---|---|---|
| EP | 0 767 389 A2 | 4/1997 | |
| GB | 2 057 628 A | 4/1981 | ............. F16F/6/00 |
| JP | 04-367271 A | 12/1982 | |
| JP | 04-360559 A | 12/1992 | |
| KR | 1995-0017673 A | 7/1995 | |
| SU | 306770 A | 10/1983 | |
| WO | WO 98/23975 A1 | 6/1998 | |

* cited by examiner

Primary Examiner—David Porta
Assistant Examiner—Christine Sung
(74) Attorney, Agent, or Firm—Fitzpatrick, Cella, Harper & Scinto

(57) ABSTRACT

A radiation imaging system comprises a radiation image detection panel having means for converting radiations into electric signals, and an outer enclosure which holds therein the radiation image detection panel, and further comprises an elastic support means. The radiation image detection panel is elastically supported by the elastic support means toward the outer enclosure.

13 Claims, 15 Drawing Sheets

RADIATION IMAGING SYSTEM

BACKGROUND OF THE INVENTION

1. Field of the Invention

This invention relates to a radiation imaging system for obtaining images two-dimensionally.

2. Related Background Art

In conventional radiation photography, a film screen system made up of sensitized paper and radiation-photographic film in combination is in wide use. According to this method, radiation that has passed through a subject such as a patient contain information about the interior of the subject ("interior information"), the information is converted into visible light proportional to the intensity of the radiation by means of the sensitized paper, and the radiation-photographic film is exposed to the light to form a radiation image on the film.

Such a film exposure method, however, requires the step of developing the film before a doctor obtains the radiation image of the patient, and has suffered from the problem that the developing step takes much labor and time. In addition, radiation-photographic films obtained by photography must be stored for a certain period in hospitals or doctor's offices, and the films stored may be enormous in number, causing a great problem for management.

To cope with such problems, recent progress in technology has brought about an increasing demand for the materialization of recording-and-reproduction of radiation image information by means of electric signals, and has already brought forward a proposal for a radiation imaging system in which radiation is converted into visible light proportional to the intensity of the radiation by means of a phosphor, and the light is converted into electric signals by the use of a photoelectric conversion element. This system has begun to be put into practical use.

Such an imaging system used in radiation photography or the like is constituted basically of a fluorescent plate which converts radiation into visible light, a photoelectric conversion element which converts the visible light into electric signals, a substrate on which the photoelectric conversion element is mounted, a base rest which supports the substrate, a circuit board with wiring on which electronic parts for processing the photoelectrically converted electric signals are mounted, and an outer enclosure which holds these constituents.

Figure 15:
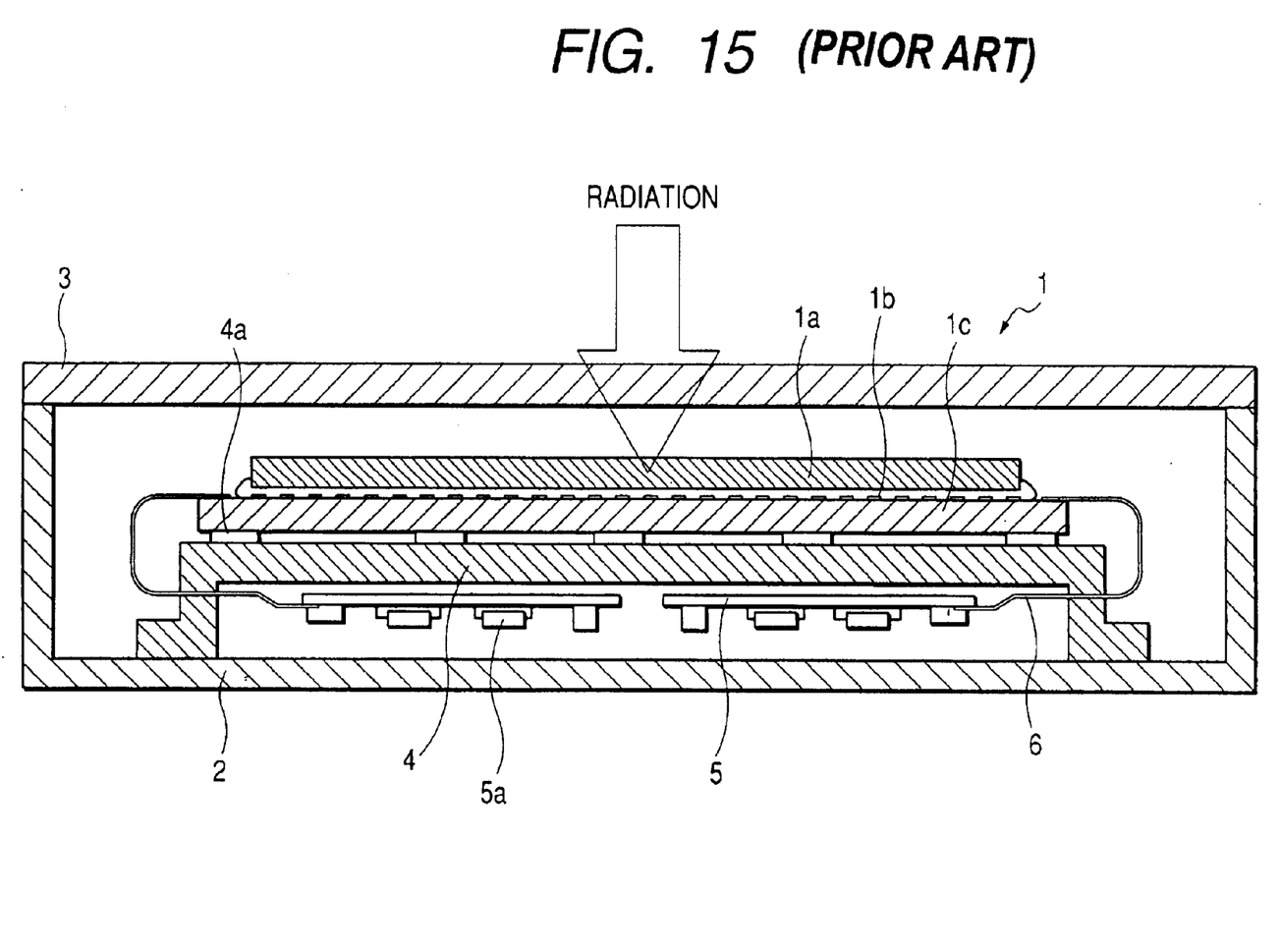
FIG. 15 is a cross-sectional view of a conventional radiation imaging system.

This is described below with reference to FIG. 15. In FIG. 15, reference numeral 1 denotes a radiation image detection panel which detects radiation and convert it into electric signals. It is constituted basically of a fluorescent plate $1a$, a photoelectric conversion element $1b$ and a substrate $1c$. For the substrate $1c$ of the photoelectric conversion element $1b$, glass sheets are widely used because it is required to undergo no chemical action with semiconductor devices, to be durable at the temperatures used in semiconductor processing, and to have dimensional stability.

For the fluorescent plate $1a$, a resin sheet coated with a phosphor comprised of a metal compound is used, and the fluorescent plate is unified with the substrate $1c$ through an adhesive. Where the photoelectric conversion element $1b$ is required to have moisture resistance, the fluorescent plate $1a$ and the photoelectric conversion element $1b$ are sealed with a moisture-impermeable and radiation-transmissive film (not shown) in some cases.

These are fastened to the base rest 4 via a spacer $4a$ by bonding, thus forming the radiation image detection panel 1.

Reference numeral 5 denotes a circuit board on which electronic parts $5a$ for processing the photoelectrically converted electric signals are mounted, and which is connected with the photoelectric conversion element $1b$ through a flexible circuit board 6. These are fastened inside a casing 2 and are further closed with a radiation-transmissive casing cover 3. In this way, the radiation imaging system is set up hermetically sealed in an outer enclosure consisting of the casing 2 and the casing cover 3.

Imaging systems of this kind have hitherto been used in radiation imaging systems of a stationary type. In recent years, however, there has also come to be a demand for imaging systems of a portable type which are light-weight and compact so that the photography can be performed rapidly, with high precision and also on various portions of the human body.

Accordingly, in the designing of systems it has come to be taken into consideration that a load is partly applied by a subject (patient) to the casing cover 3, causing the outer enclosure to deform and so to come into contact with the radiation image detection panel 1, breaking the latter, and thus it has come to be required to pay attention also to resistance to deformation under load. Especially for the purposes of protecting the substrate $1c$ from any impact and vibration applied when thee apparatus is carried and from any possible breakage when dropped, and of preventing the outer enclosure from undergoing deformation due to any load applied at the time of radiation photography, it has been necessary for the base rest 4, the outer enclosure (casing 2 and casing cover 3) and so forth to have a strong structure. In order to protect the inside radiation image detection panel 1 from any breakage caused by the casing cover 3 deforming and coming into contact with it, it is necessary to keep a large space between the casing cover 3 and the radiation image detection panel 1 (fluorescent plate). This hinders the imaging system from being made compact and light-weight. If, however, the casing cover 3 is made with an excessively large thickness to make it strong, the casing cover 3 may absorb significant radiation when the radiation pass through it, making the production of good images problematic.

SUMMARY OF THE INVENTION

The present invention was made in order to solve the above problems. Accordingly, an object of the present invention is to provide a radiation imaging system which enjoys properties of resistance to deformation under load, resistance to impact and resistance to vibration, and is compact and light-weight.

To achieve this object, the radiation imaging system of the present invention comprises a radiation image detection panel having means for converting radiation into electric signals, and an outer enclosure which holds therein the radiation image detection panel. An elastic support means elastically supports the radiation image detection panel relative to the outer enclosure.

With such a construction, even when a load is applied by the subject (patient) to the casing cover of the outer enclosure, deforming the casing cover, the radiation image detection panel can move toward the inside, acting against the elasticity of the elastic support means. Also, even impacts and vibrations occurring when the apparatus is carried can be absorbed by the elastic support means sufficiently that the panel can be prevented from breaking.

Details will become apparent from the description of the preferred embodiments below.

DESCRIPTION OF THE PREFERRED EMBODIMENTS

Embodiments of the present invention are described below with reference to the accompanying drawings.

(First Embodiment)

Figure 1:
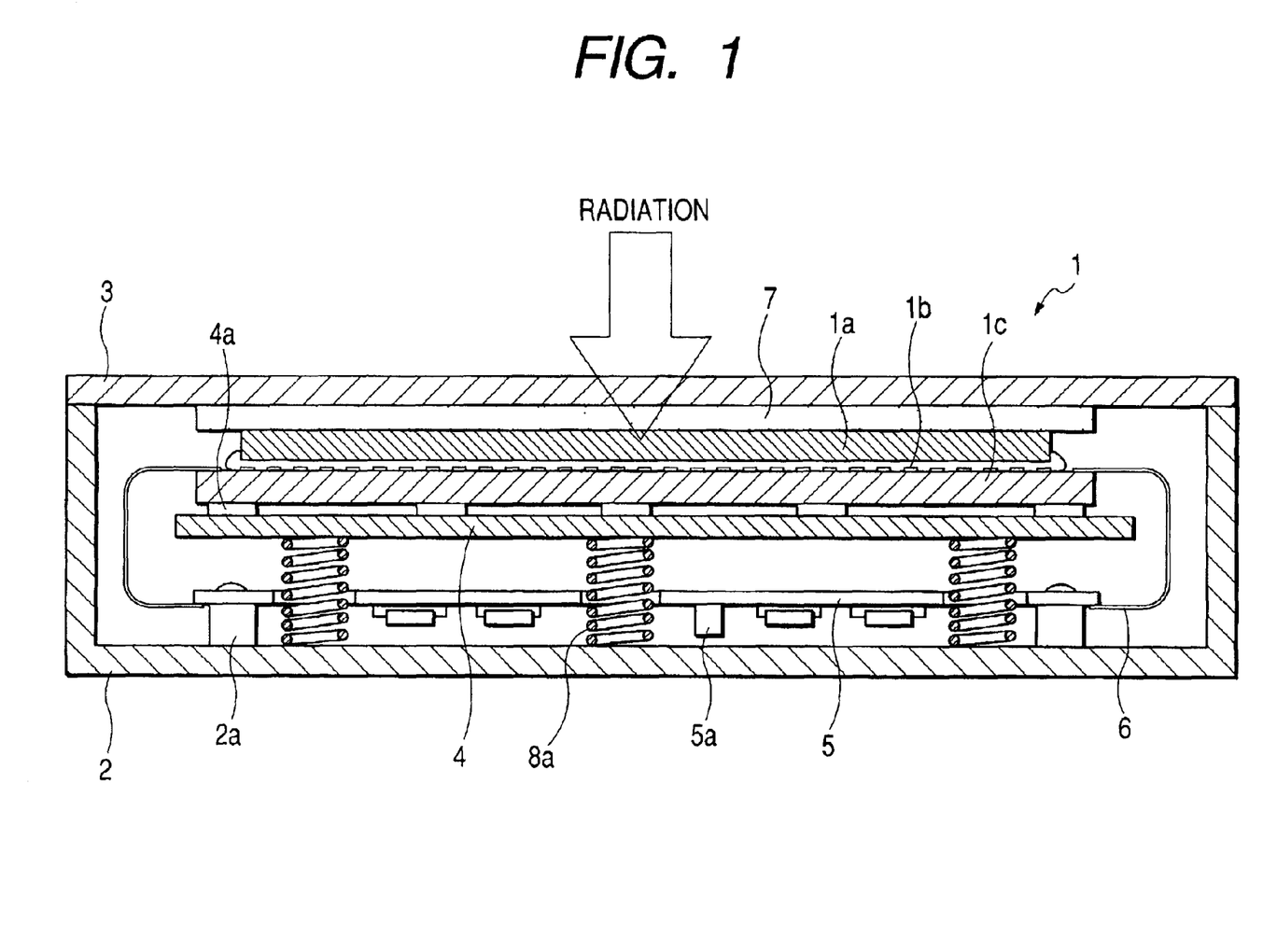
FIG. 1 is a cross-sectional view of a radiation imaging system according to a first embodiment of the present invention.

FIG. 1 cross-sectionally illustrates a radiation imaging system according to a first embodiment of the present invention. In FIG. 1, reference numeral 1a denotes a fluorescent plate; 1b, a semiconductor device such as a photoelectric conversion element or a radiation detector, disposed two-dimensionally; and 1c, a substrate such as a glass sheet. These are integrally formed to make up a radiation image detection panel 1 as a whole. Reference numeral 4 denotes a support plate supporting the radiation image detection panel 1, which is fastened to the latter by both being bonded to a spacer 4a which is between them. This support plate, however, need not be provided, and the substrate 1c may be directly supported by an elastic support means as described below. An outer enclosure is constituted of a casing 2 and a casing cover 3 sealed to the former's open-top edge.

Reference numeral 6 denotes a flexible circuit board through which signals of the photoelectric conversion element are taken out; and 5, a circuit board on which electronic parts 5a for processing the signals are mounted. The circuit board 5 is, for the purpose of making the device compact, disposed between the back of the support plate 4 and the bottom of the casing 2 and is attached to the inside of the casing 2 with a means such as screws.

A glass sheet or the like is used as the substrate 1c. On the inside of the casing cover 3, a sheetlike cushioning material 7 formed of a radiation-transmissive elastic material is provided between the casing cover 3 and the radiation image detection panel 1. Since the cushioning material 7 is provided, the radiation image detection panel 1 can uniformly receive pressure when it is pressed, and hence the radiation image detection panel 1 can more preferably be prevented from, e.g., being scratched. The cushioning material 7 need not particularly be provided, depending on the material of the outer enclosure or the purpose of radiation detection. The radiation image detection panel 1 is pressed toward the casing cover 3 of the outer enclosure optionally via the cushioning material 7 (i.e., the latter material 7 is between the panel 1 and the cover 3), by means of at least one compression coiled spring 8a which is the elastic support means according to the present embodiment of the invention. As the cushioning material 7, a flexible formed resin or a rubber member may be used. A sheet-like member of about 3 mm thickness made by expanding a silicone resin may preferably be used, since decrease in radiation transmittance ca be prevented.

At the time of radiation photographing, the load may be applied by a subject (patient) to the casing cover 3 as stated previously, but the radiation image detection panel 1 can escape therefrom acting against the compression coiled springs 8a. Hence, this can serve to prevent any break of the panel.

Incidentally, the casing 2 and the casing cover 3 are required to have the performance of resisting the deformation under load and the performance of transmitting the radiation and to be light-weight, and hence may preferably be made up using a metallic material and a material such as CFRP (carbon fiber reinforced plastic) in combination.

In the present embodiment, the circuit board 5 is fastened to the casing 2 through protrusions 2a provided partly thereon, with a means such as screws, and only the radiation image detection panel 1 is elastically supported with the compression coiled springs 8a in the direction of irradiation. Accordingly, only a moderately strong elastic force is required.

Figure 2:
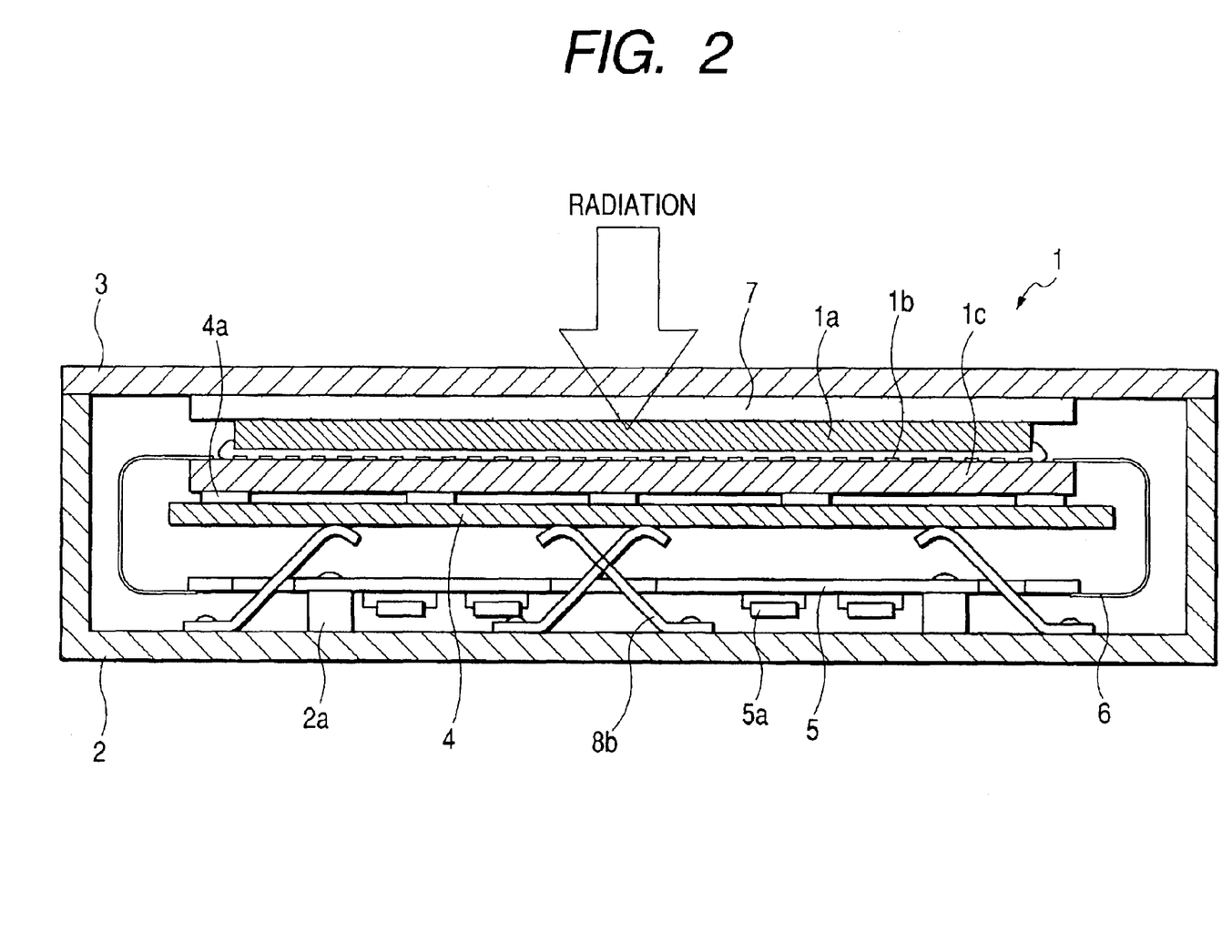
FIG. 2 is a cross-sectional view of a modification of the radiation imaging system according to the first embodiment.

The compression coiled springs 8a also force the support plate 4 up, extending through the circuit board 5 (the circuit board 5 has holes at the part where the compression coiled springs 8a are provided, and is made up as a perforated board). Also, in place of the compression coiled spring 8a, leaf springs 8b may be used, as shown in FIG. 2. Still also, the fluorescent plate 1a, which is a wavelength conversion member, is provided for detecting radiation, but need not particularly be provided where a device directly sensitive to radiation is used in the radiation detector.

The present embodiment may particularly preferably be used when a material which is very fragile and is weak under loads and impacts, such as a glass sheet, is used as the substrate 1c.

In the following embodiments, component parts which function like those shown in the previous drawings are denoted by like reference numerals to avoid repeating their description.

(Second Embodiment)

Figure 3:
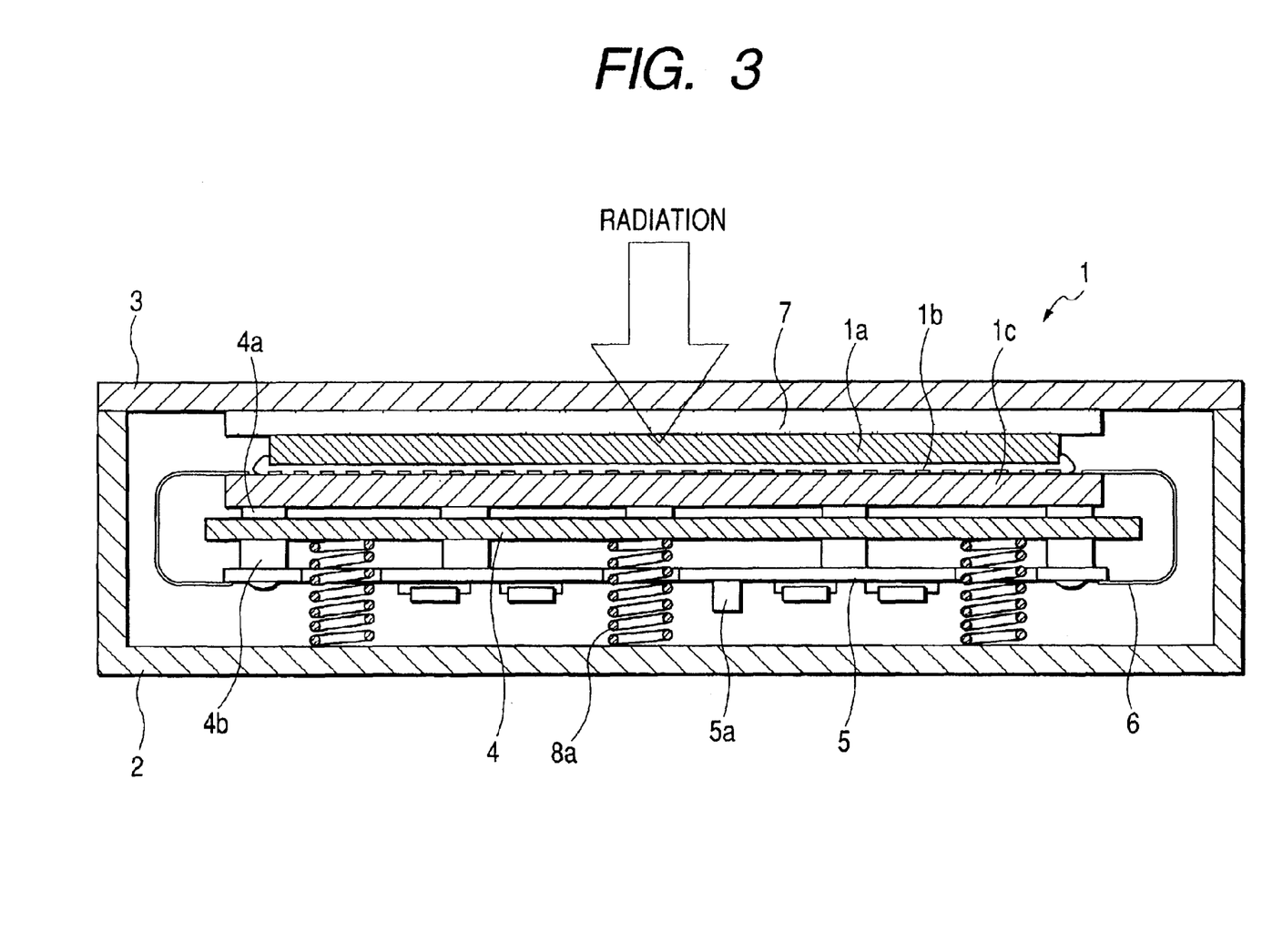
FIG. 3 is a cross-sectional view of a radiation imaging system according to a second embodiment of the present invention.
Figure 4:
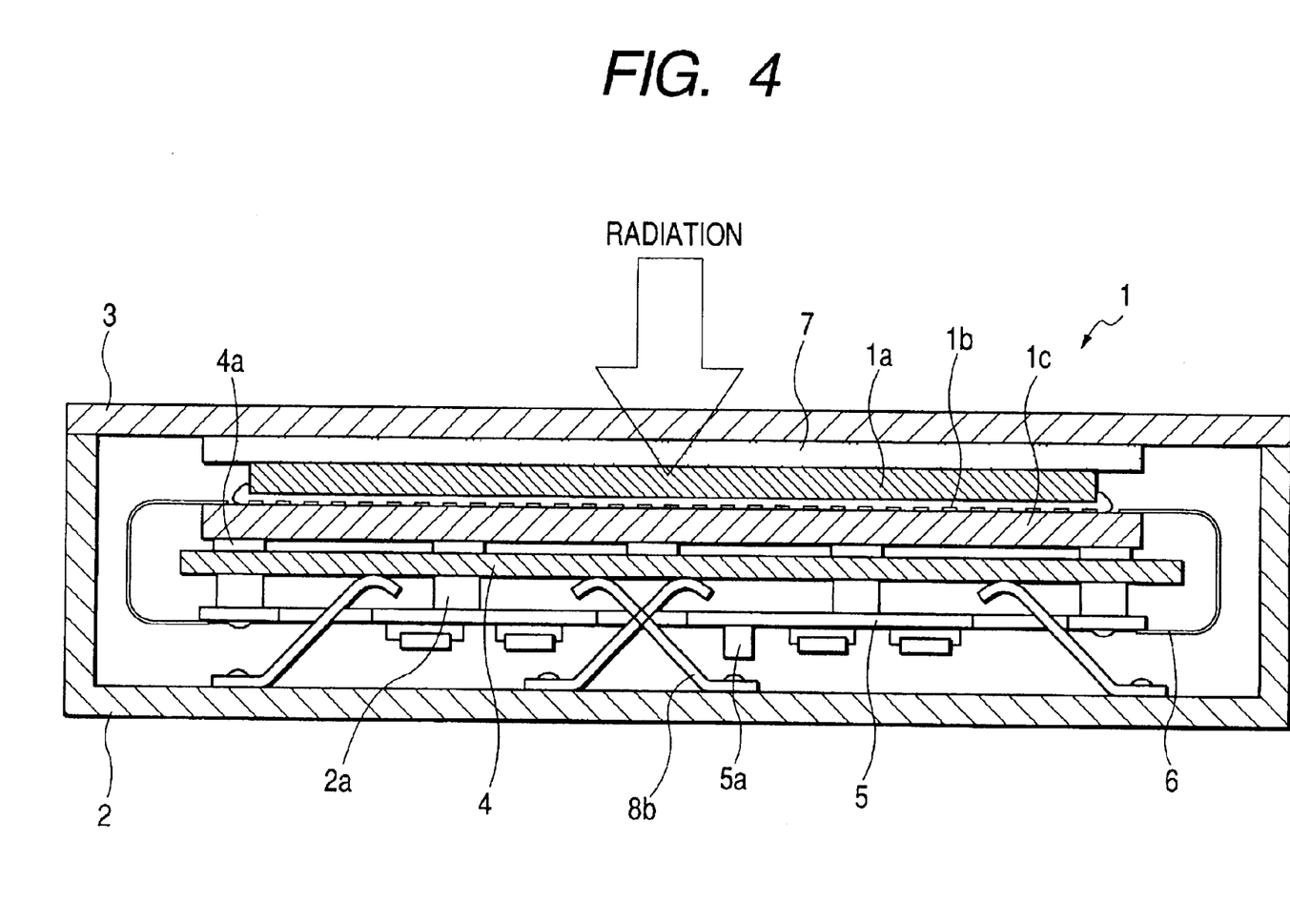
FIG. 4 is a cross-sectional view of a modification of the radiation imaging system according to the second embodiment.

FIG. 3 is a cross-sectional view of a radiation imaging system according to the second embodiment of the present invention, which is so constructed that the circuit board 5 is not fastened to the casing 2 but fastened to the support plate 4 through protrusions 4a provided partly thereon, with a means such as screws. Thus, the compression coiled springs 8a force the radiation image detection panel 1 and circuit board 5 up via the support plate 4 in the direction of the casing cover 3. Also, in place of the compression coiled spring 8a, leaf springs 8b may be used, as shown in FIG. 4.

Since in the present embodiment the circuit board 5 is not fastened to the casing 2, this construction can be more effective against any impacts and vibrations during transportation, compared with constructions in which it is fastened thereto.

(Third Embodiment)

Figure 5:
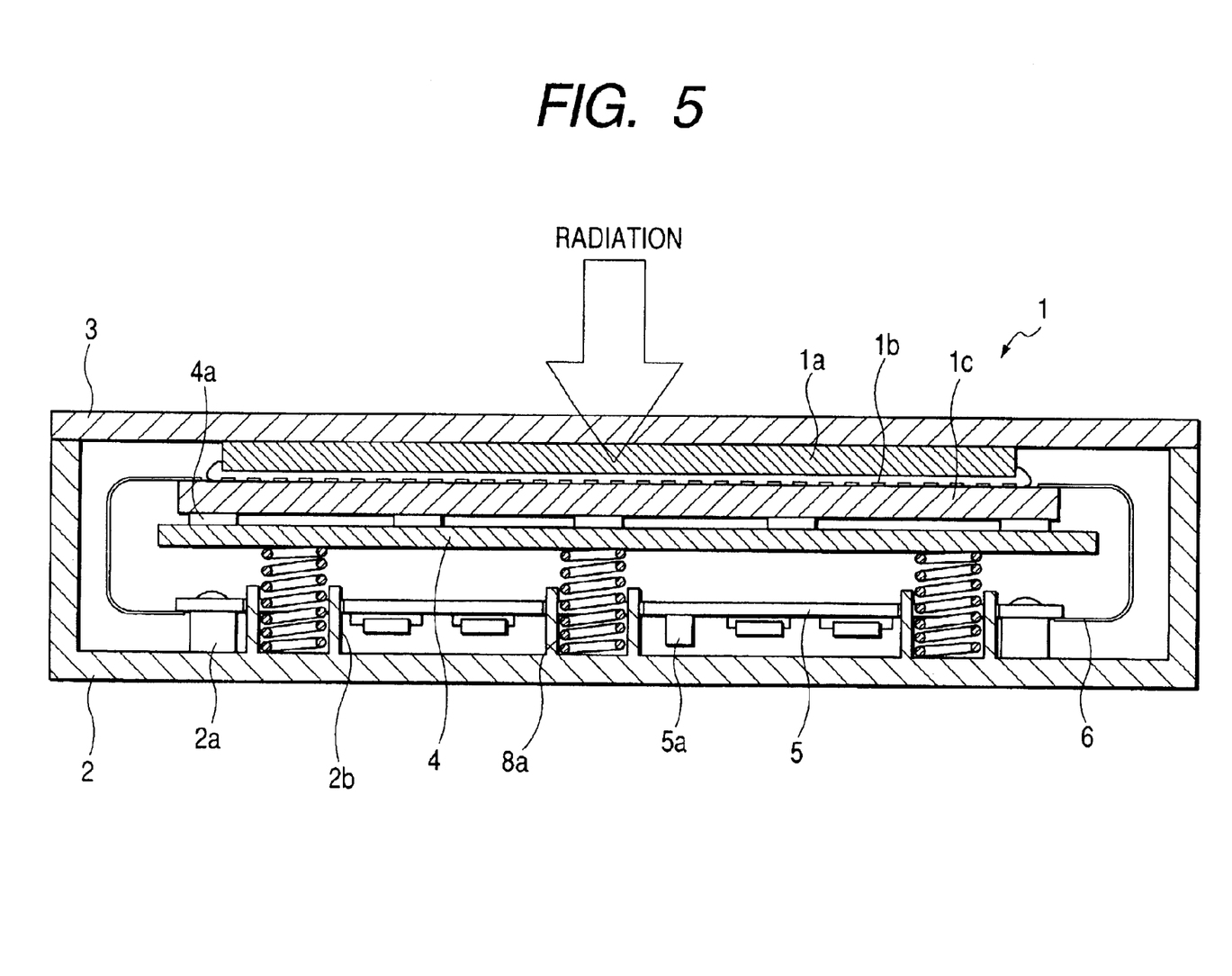
FIG. 5 is a cross-sectional view of a radiation imaging system according to a third embodiment of the present invention.

FIG. 5 is a cross-sectional view of a radiation imaging system according to the third embodiment of the present invention. As shown in FIG. 5, the radiation imaging system has a cylindrical stopper 2b which is provided on the casing 2 in such a way that it surrounds the lower half of each compression coiled spring 8a extending between the support plate 4 and the bottom of the casing 2, and restricts the range in which the support plate 4 is movable downward.

Figure 6:
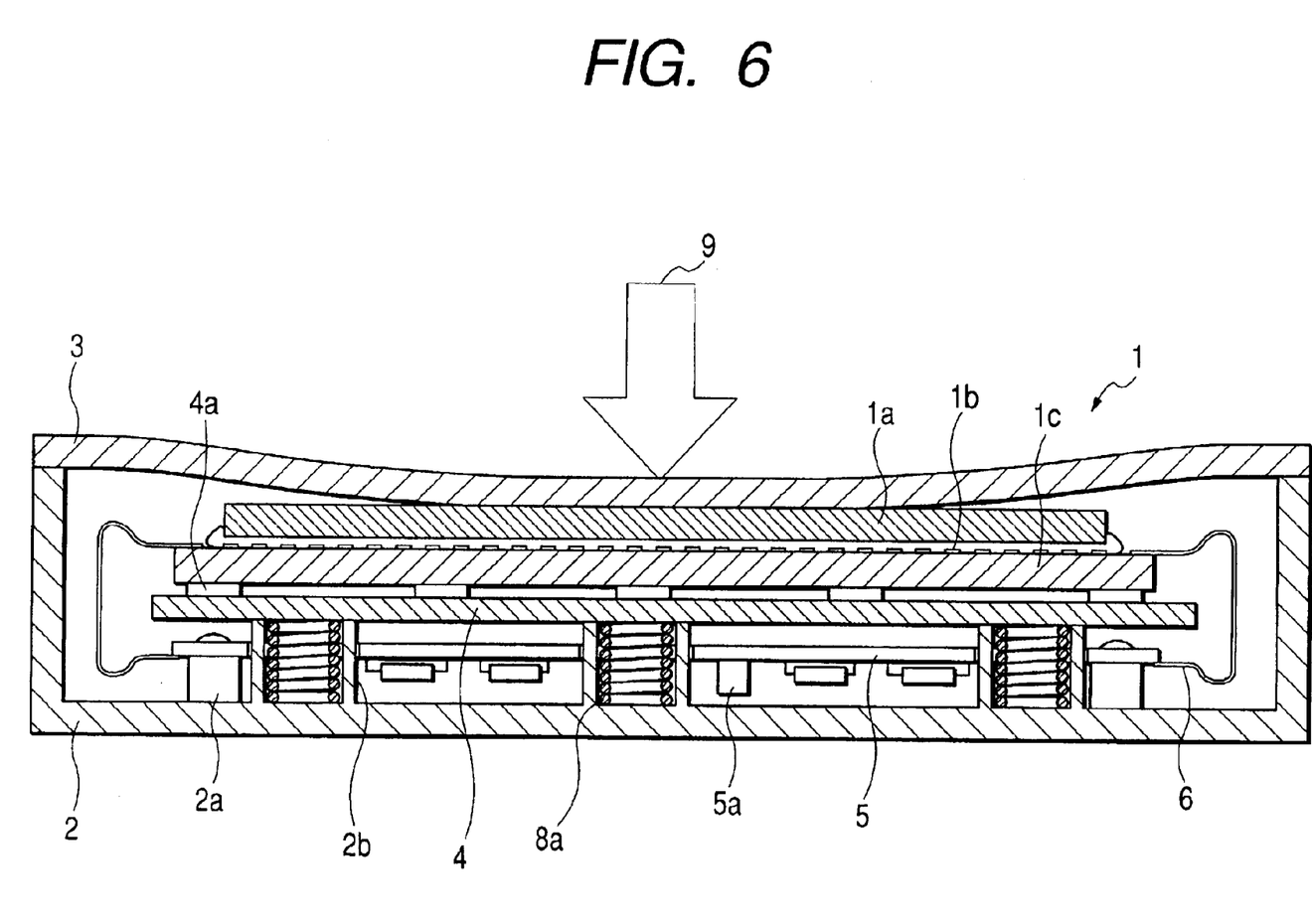
FIG. 6 shows a condition in which a load is applied to the device shown in FIG. 5.

FIG. 6 shows a view where a load of the subject (patient) has been applied in the construction shown in FIG. 5. As shown in FIG. 6, each stopper 2b provided on the bottom of the casing 2 has the function of restricting the movable range and at the same time the function of a guide of the compression coiled spring 8a when the radiation image detection panel 1 moves downward with the deformation of the casing cover 3 upon application of a load 9 of the subject (patient) to the casing cover 3 at the time of radiation photography. As is also apparent from the drawing, the use of the flexible circuit board 6 enables further absorption of impacts. As can be seen from FIG. 6, it is preferable that since the electronic parts 5a are provided on the side opposite to the base rest side, the electronic parts 5a can be prevented from breaking under the load applied by the subject at the time of radiation photography.

Here, the height of the stopper 2b is set a little larger than the height of the circuit board 5 so that the circuit board 5 and electronic parts 5a are not damaged when the support plate 4 (made integral with the radiation image detection panel 1 in this embodiment) moves downward and is restricted by the stopper. Also, the stopper 2b is so provided that it can pass through holes formed in the circuit board 5.

The casing 2 and the casing cover 3 are required to have, as stated previously, adequate ability to resist the deformation under loads, and to transmit incident radiation and must be light-weight, and hence may preferably be made up using a metallic material and a material such as CFRP (carbon fiber reinforced plastic) in combination. In the present embodiment, a magnesium alloy is used in the casing 2 as a material having a high modulus of elasticity and a small specific gravity, and CFPR having a high radiation transmittance is used in the casing cover 3.

With such construction of the present embodiment, even when a load is applied by the subject (patient) to the casing cover 3, deforming the outer enclosure, the radiation image detection panel 1 can escape damage by pressing against the compression coiled springs 8a, and hence the panel can be prevented from being damaged or breaking.

In addition, in the present embodiment, only the casing cover 3 lies between the subject (patient) and the radiation image detection panel 1; the distance between the subject (patient) and the radiation image detection panel 1 may be small, and also the outer enclosure, in particular, the casing cover 3, may deform. Even in such cases, the distance between them can always be kept constant by the action of the compression coiled springs 8a. Thus, any scattering, attenuation and so forth of radiation can be kept to a minimum, and good radiation images can be obtained.

With regard to impacts and vibrations applied when the apparatus is carried and possible breakage when dropped, the wavelength conversion member such as the fluorescent plate 1a can be made to function as a cushioning material 7 by means of appropriate selection of layer thickness and choice of materials therefor, and can absorb the impact, and thus the radiation image detection panel 1 can be prevented from breaking.

Figure 7A:
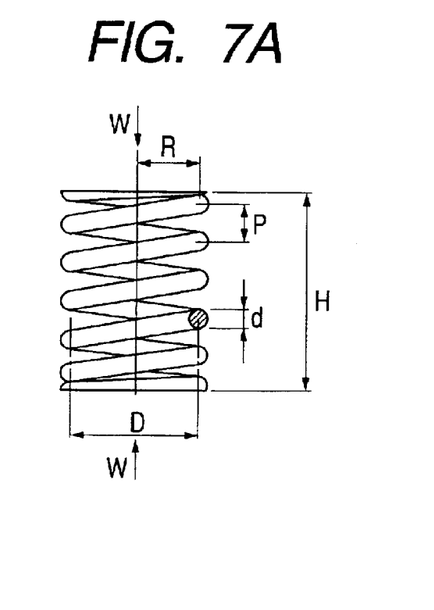
FIGS. 7A, 7B, 7C, 7D and 7E show examples for constructing the elastic support means used in the present invention.
Figure 7B:
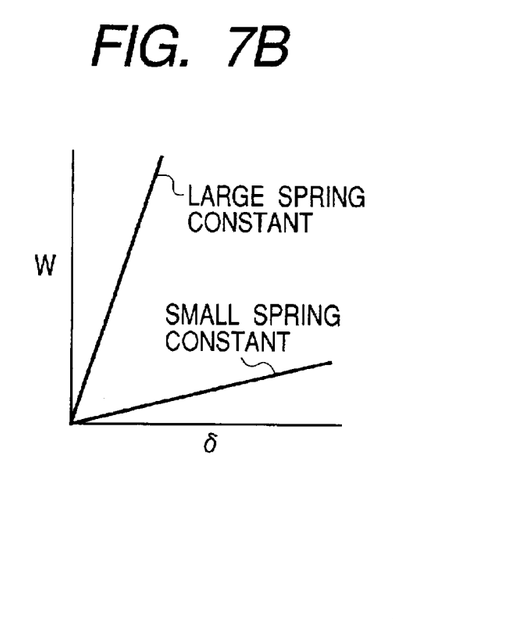
Figure 7C:
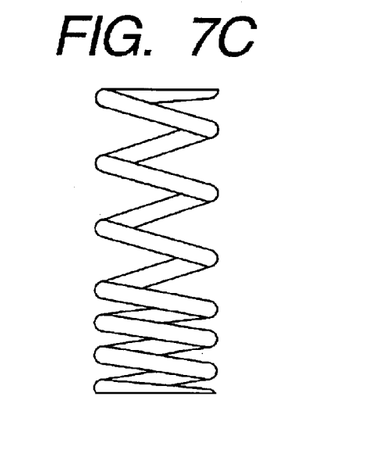
Figure 7D:
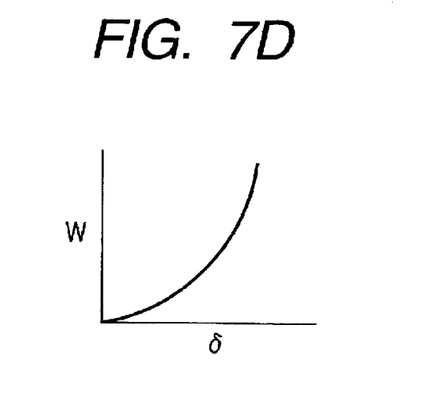
Figure 7E:
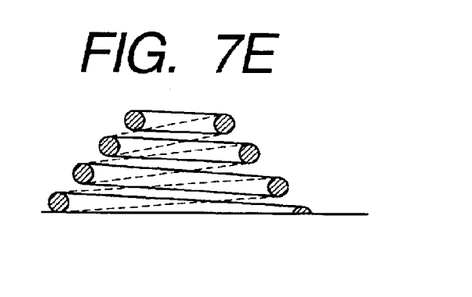

The elastic support means used in the present embodiment may have the construction as shown in FIGS. 7A, 7C and 7E. More specifically, the compression coiled spring 8a used here employs, as shown in FIG. 7A, a constant-pitch compression coiled spring, the wire of which is wound into a series of spirals with constant pitches between them. In FIG. 7A, W represents the load; D, the average diameter of the coil; d, the diameter of the wire of the coil; H, the free height; and R, the distance from the center to the wire of the coil. In this case, the force acting on the spring, e.g., the relationship between a load W of a subject (patient) and a deflection δ of the casing cover 3, is linear, as shown in FIG. 7B. In other words, spring constant K=force W acting on spring/deflection δ is always invariable. Of course, such a compression coiled spring having an invariable spring constant K may be used. However, an elastic member that can sensibly respond first to the impact force or the load applied by the subject (patient) is preferred because the panel can then better be prevented from breaking.

More specifically, as shown in FIG. 7C, it is preferable to use a spring member whose spring constant K is small first and becomes larger gradually. As such a spring member, an inconstant-pitch compression coiled spring may preferably be used, whose spirals into which the wire is wound are not constant in distance (i.e., the spring constant K is not invariable) as shown in FIG. 7D. That is, this is because the turns of the coil come into close contact consecutively from the part having a smaller pitch and hence the number of windings that act effectively decreases with an increase in deflection.

The use of such an inconstant-pitch compression coiled spring can make small the amount of movement itself of the radiation image detection panel 1 and so forth, because the spring is made to sensibly respond first to the impact or load to absorb the impact force instantaneously and thereafter its displacement is made small with respect to the load. Thus, such a spring may preferably be used in order to make the device compact and light-weight.

As a further example, in relation to the space inside the radiation imaging system, a conical compression coiled spring as shown in FIG. 7E may be used in order to lessen the compression height of the spring as far as possible to make the device more compact. Such a conical compression coiled spring also has a spring constant K which is not invariable, and has the relationship between the load and the deflection just as shown in FIG. 7D. Hence, the compression height of the spring at its turn of the final stage can be made small, in fact close to the coil wire diameter. Thus, such a spring may preferably be used in order to make the device compact and light-weight.

The use of a spring whose spring constant K is invariable brings the natural frequency of the spring and the frequency of the device itself into agreement, and may thus cause the phenomenon of resonance in some cases. On the other hand, the use of a spring whose spring constant K is not invariable is more preferred, because then the natural frequency is not constant, and the phenomenon of resonance of the device itself can be avoided.

Figure 8:
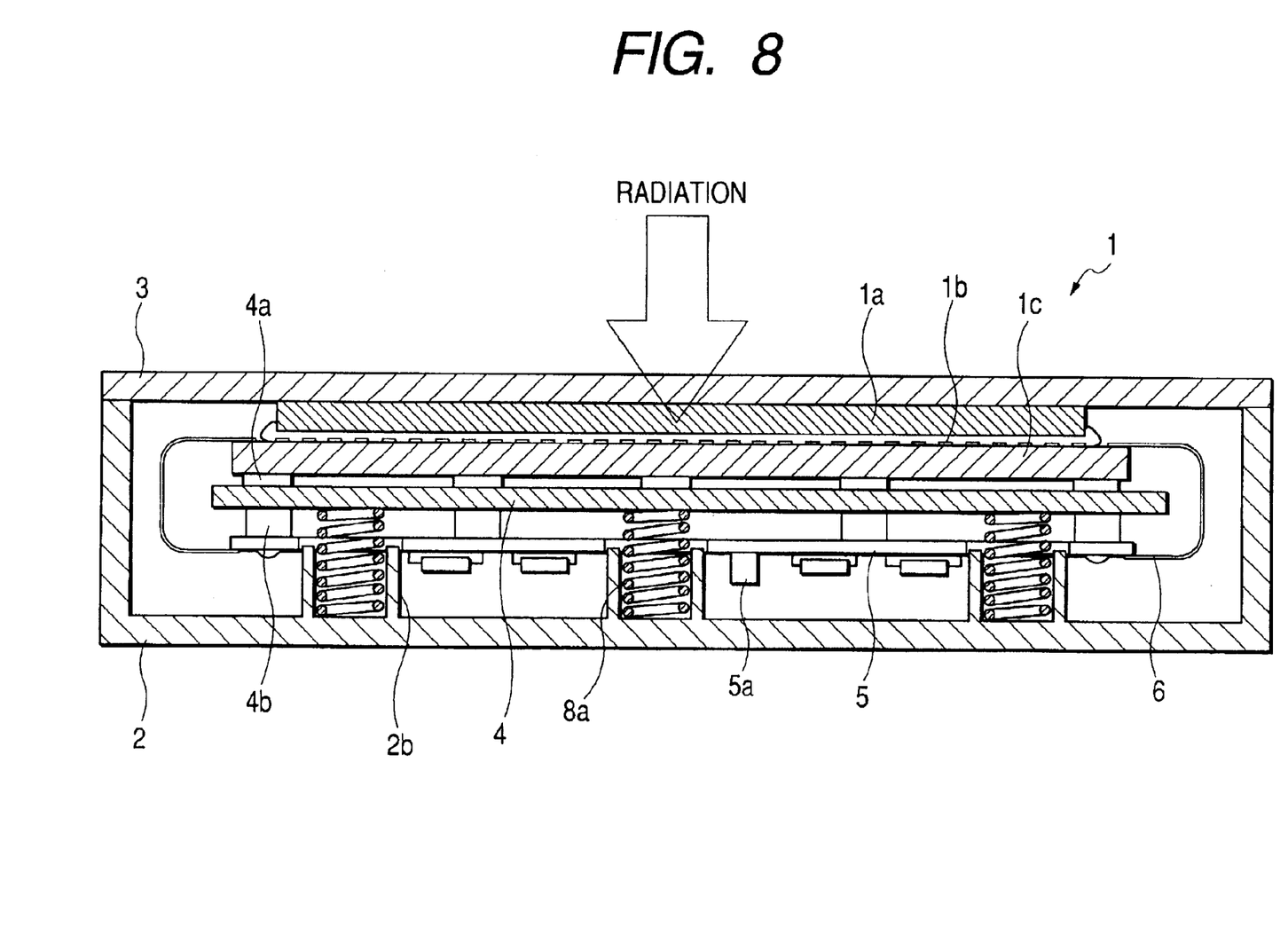
FIG. 8 is a cross-sectional view of a modification of the radiation imaging system according to the third embodiment.
Figure 9:
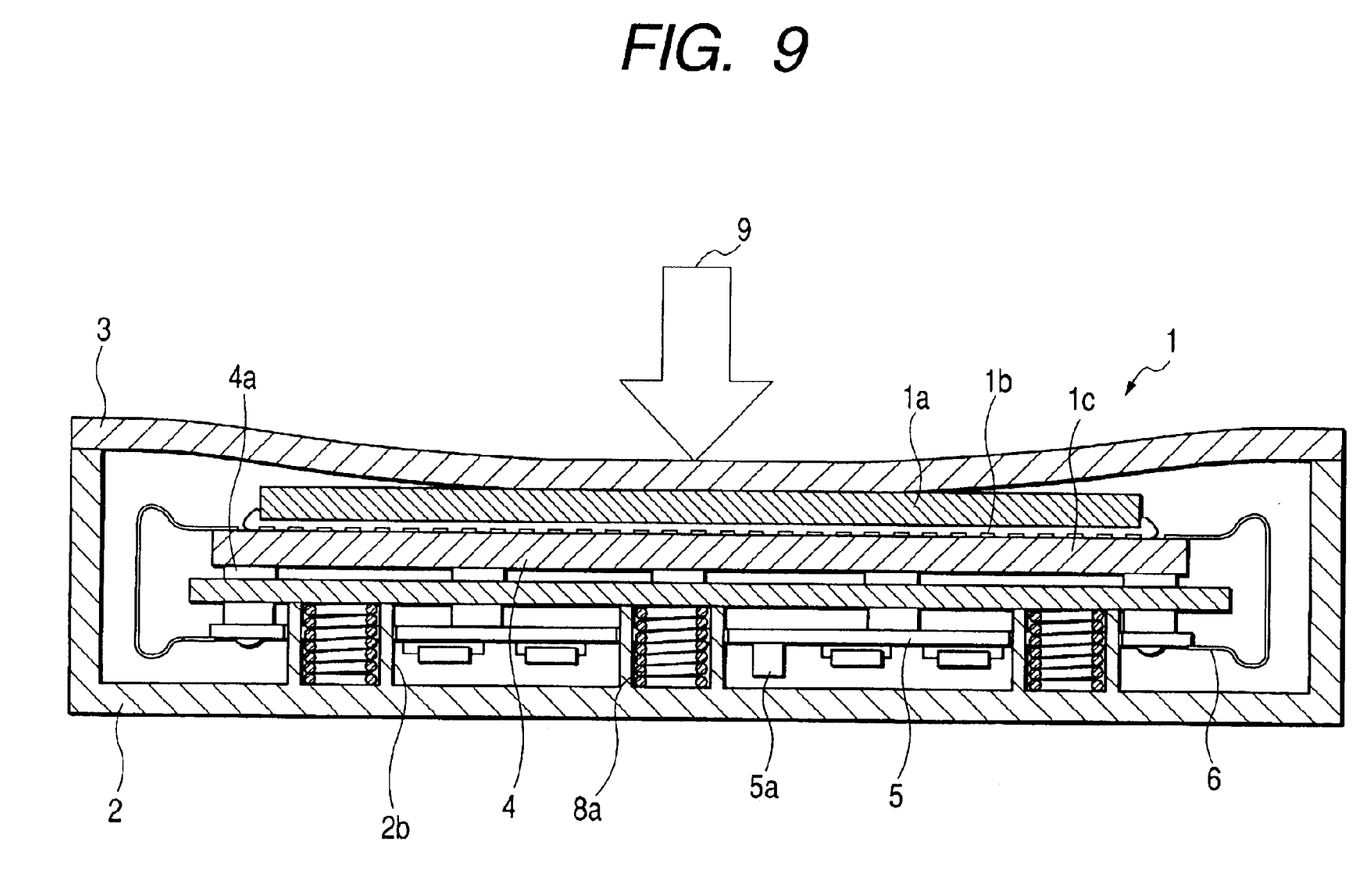
FIG. 9 shows a condition in which a load is applied to the device shown in FIG. 8.

The system may also have the construction as shown in FIG. 8, in which the circuit board 5 is fastened to the support plate 4 through protrusions 4a provided partly thereon, with a means such as screws. A view where a load has been applied in such construction is shown in FIG. 9. As can be seen from FIG. 9, it is preferable that since the electronic parts 5a are provided on the side opposite to the base rest side, the electronic parts 5a can be prevented from breaking when the load of the subject is applied at the time of radiation photographing.

(Fourth Embodiment)

Figure 10:
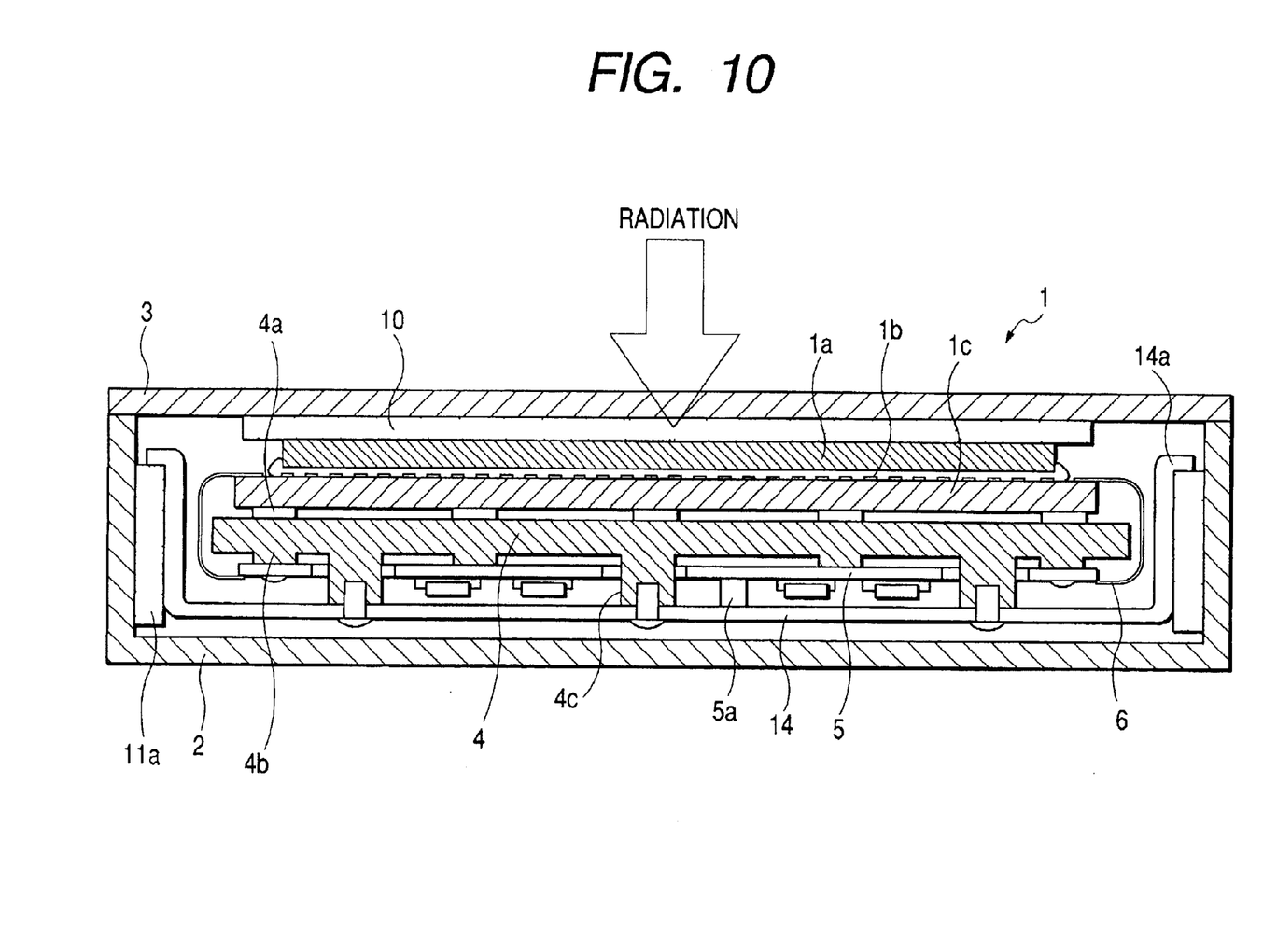
FIG. 10 is a cross-sectional view of a radiation imaging system according to a fourth embodiment of the present invention.

FIG. 10 is a diagrammatic cross-sectional view of the present embodiment. The radiation image detection panel 1, the support plate 4 and the electric-circuit board 5 are held in an inner case 14 provided inside the outer enclosure, and the inner case 14 is elastically supported by means of an elastic support means, on the inner surface of the outer enclosure on the side of irradiation.

The inner case 14 is box-shaped, and is set open at least on the side where the radiation is incident. On its open edges, it has a support flange 14a extending outward. The inner case 14 may be made from a metallic plate processed by press drawing, taking advantage of the strength of such a material.

In the present embodiment, the elastic support means is constituted of an elastic member 10 provided on the inner surface of the casing cover 3 of the outer enclosure, and an elastic member 11a held between the support flange 14a and the inner bottom of the casing 2 along its inner sidewall. Alternatively, this elastic member 11a may be bonded to the inner surface of the casing 2. The elastic force of this elastic member 11a depends on its thickness, height, width and hardness.

In the present embodiment, the electric-circuit board 5 is supported by the support plate 4 and the radiation image detection panel 1, support plate 4 and electric-circuit board 5 are guarded by the inner case 14. Hence, the device can be protected not only from up-and-down vibrations but also from right-and-left swings. Also, on the sidewall, the elastic member 11a absorbs up-and-down impacts, and thus, this is preferable because the wall thickness of the casing 2 can be made small. Reference numeral 4c denotes a protrusion.

Figure 11:
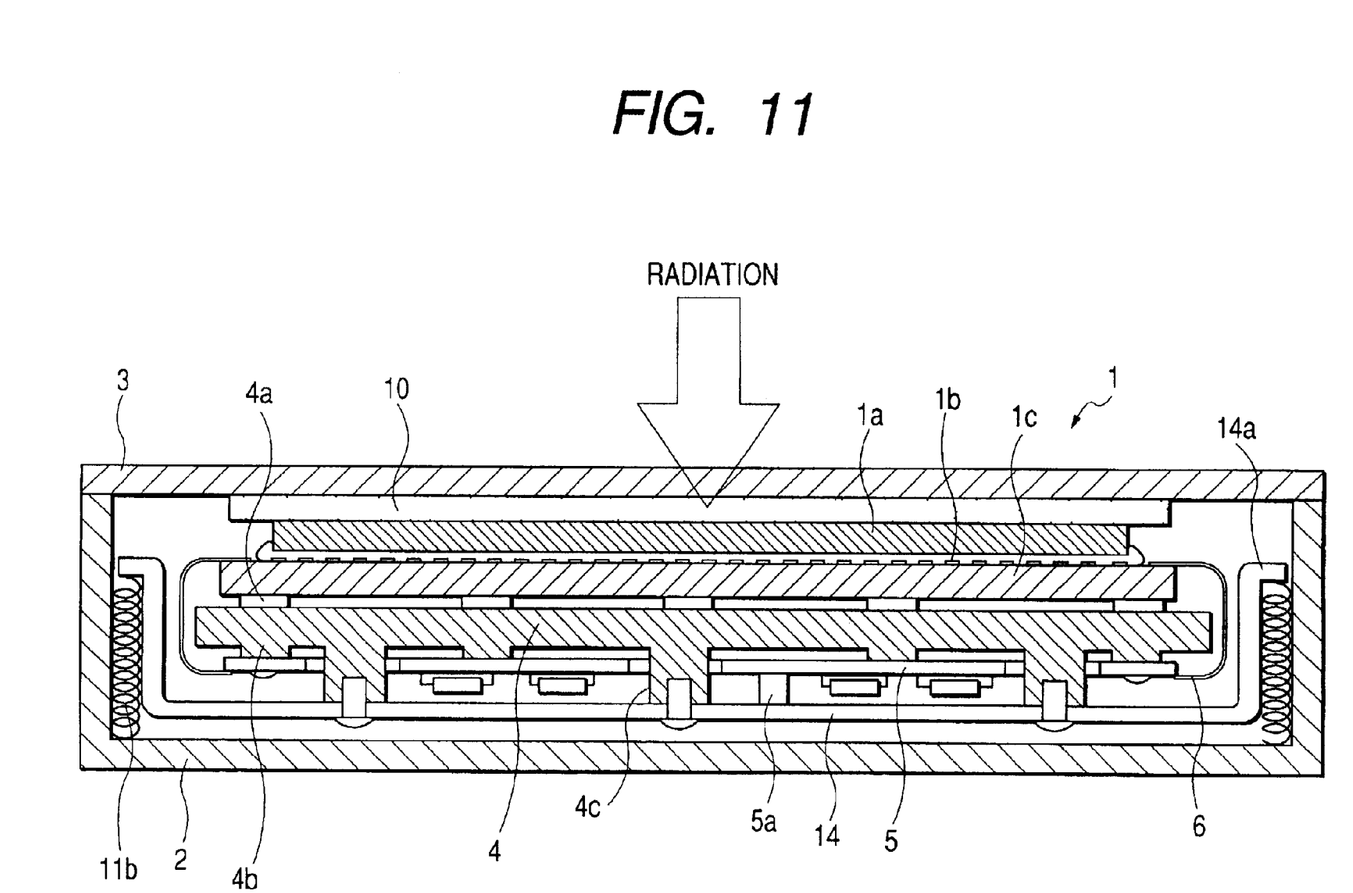
FIG. 11 is a cross-sectional view of a modification of the radiation imaging system according to the fourth embodiment.

In place of the elastic member 11a, compression coiled springs 11b may also be used, as shown in FIG. 11, or leaf springs may be used. The use of the compression coiled springs 11a is preferable because the elastic support means can be assembled without use of any means such as adhesives.

Figure 12:
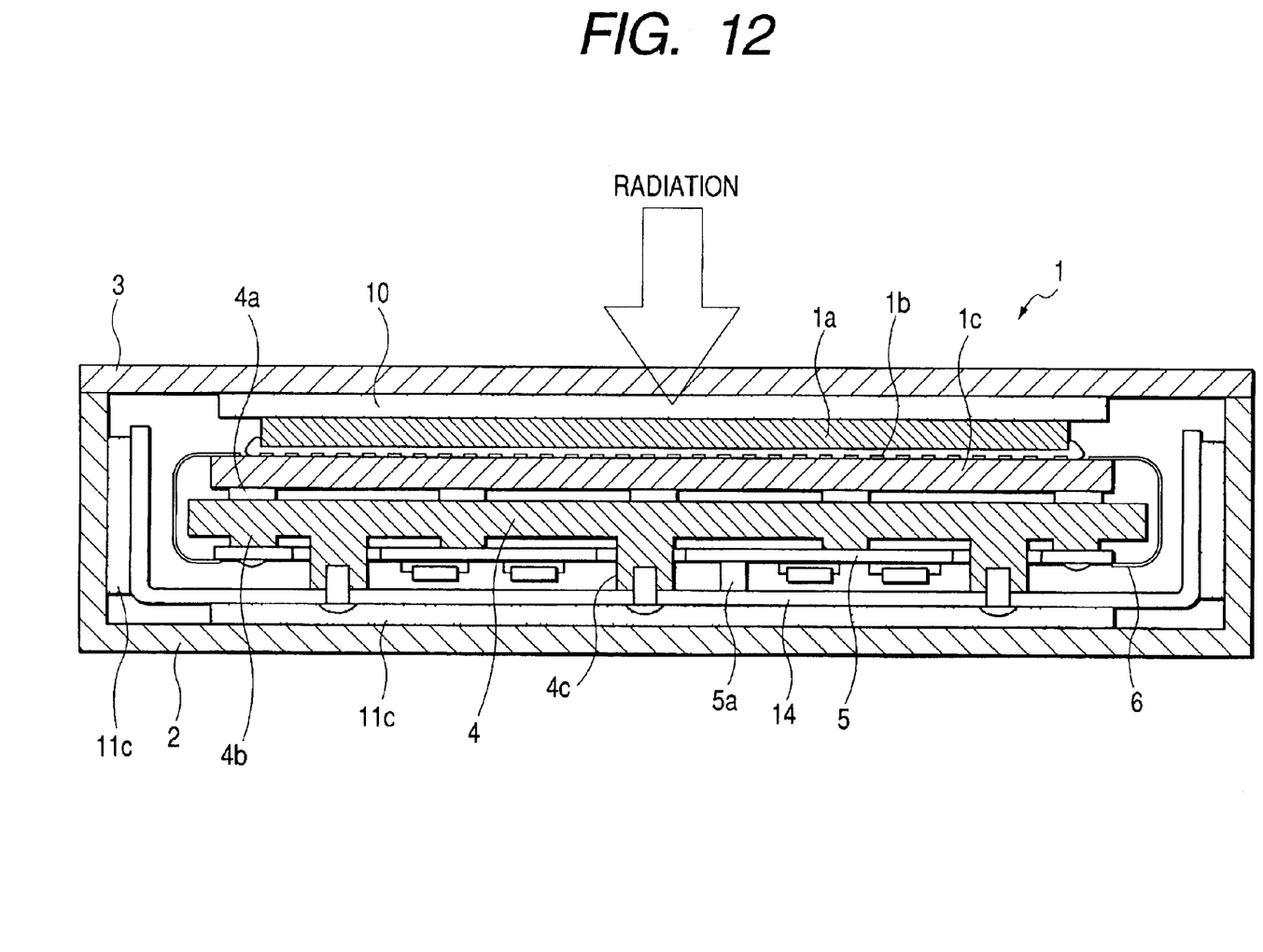
FIG. 12 is a cross-sectional view of another modification of the radiation imaging system according to the fourth embodiment.

As also shown in FIG. 12, the elastic member or the like as the elastic support means may be divided so as to be provided partly on the side wall and partly on the bottom. Also, elastic members 11c which elastically supports the inner case 14 up and down and right and left may be provided on the side wall and the bottom inside the casing 2. In the case of such construction, the inner case 14 is not provided with any support flange 14a so that enough room for absorbing right-and-left vibrations can be ensured.

(Fifth Embodiment)

Figure 13:
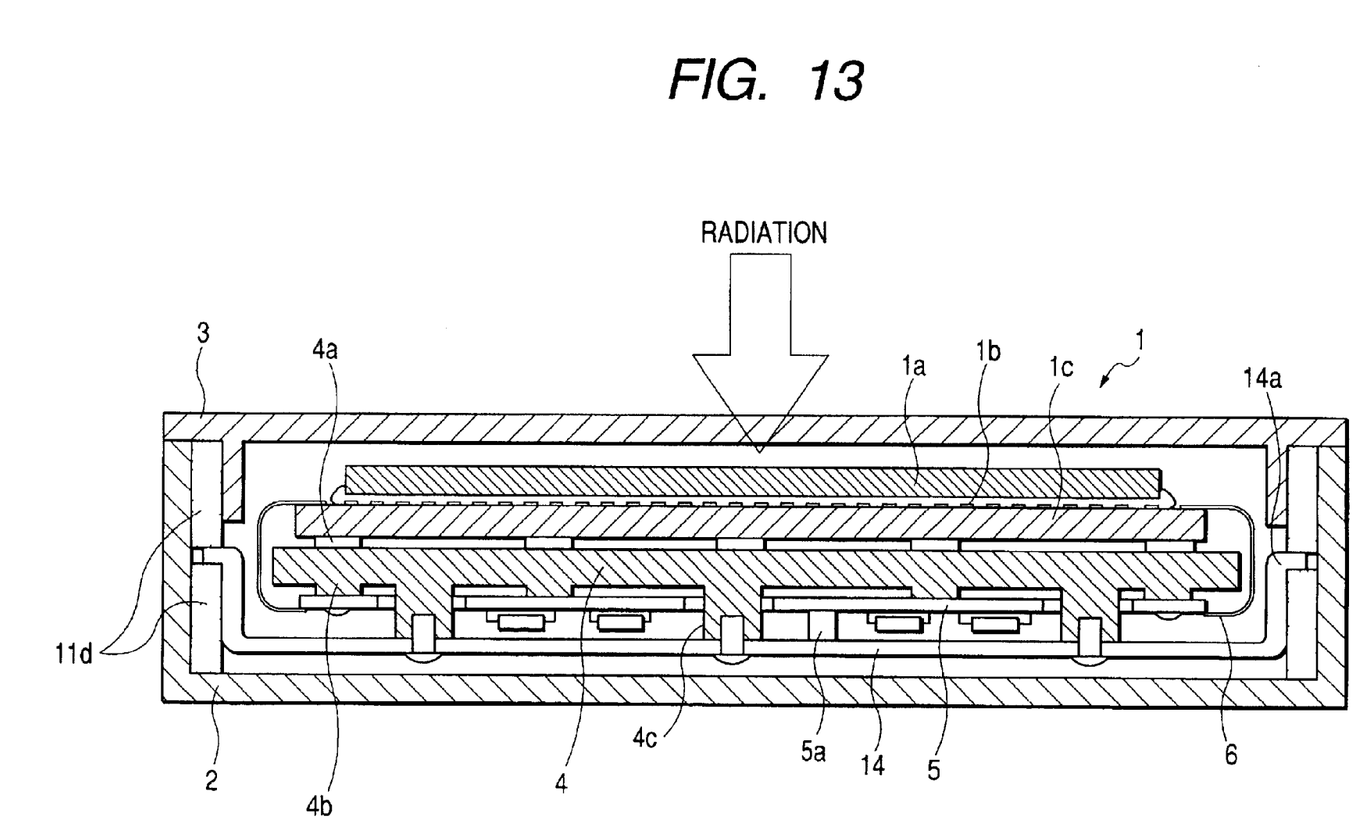
FIG. 13 is a cross-sectional view of a radiation imaging system according to a fifth embodiment of the present invention.

In the present embodiment, as shown in FIG. 13, the radiation image detection panel 1, the support plate 4 and the electric-circuit board 5 are supported by the inner case 14, and these are kept in a suspension state by the elastic support means inside the casing 2. Hence, rubbery elastic members 11d are provided on the inner sidewall of the casing cover 3 at its upper part and bottom part, respectively, bordered at the support flange 14a.

Figure 14:
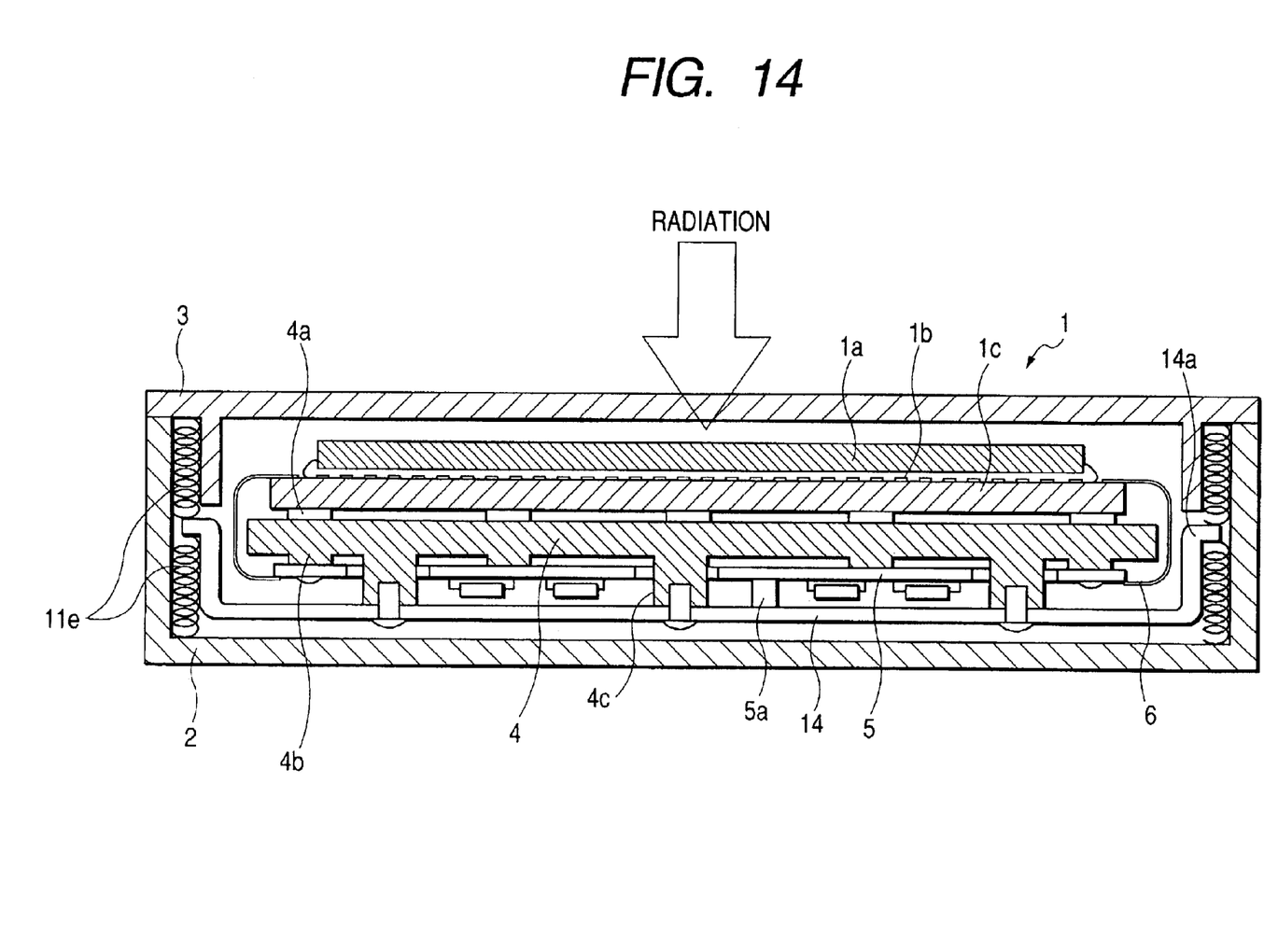
FIG. 14 is a cross-sectional view of a modification of the radiation imaging system according to the fifth embodiment.

As shown in FIG. 14, compression coiled springs 11e may also be used as the elastic support means.

What is claimed is:

1. A radiation imaging system comprising:
   a radiation image detection panel having means for converting radiation into electrical signals, disposed two-dimensionally in a radiation image detection area;
   an outer enclosure which holds therein the radiation image detection panel;
   a cushioning material; and
   an elastic support member,
   wherein the radiation image detection panel is elastically supported by the elastic support member toward the outer enclosure, and the cushioning material is provided between the radiation image detection panel on a radiation-incident side and the outer enclosure,
   wherein the cushioning material covers the radiation image detection area, and
   wherein the elastic support member elastically supports the radiation image detection panel from the side opposite to the radiation-incident side of the radiation image detection panel.

2. The radiation imaging system according to claim 1, further comprising an electric-circuit board.

3. The radiation imaging system according to claim 2, wherein the electric-circuit board comprises a flexible circuit board.

4. The radiation imaging system according to claim 2, further comprising a support plate which supports the radiation image detection panel, the electric-circuit board being provided integrally with the radiation image detection panel.

5. The radiation imaging system according to claim 4, further comprising a stopper which is arranged to restrict the range in which the support plate is movable downward.

6. The radiation imaging system according to claim 1, wherein the elastic support means comprises a compression coiled spring, a leaf spring or a rubbery member.

7. The radiation imaging system according to claim 1, wherein the elastic support means comprises a spring member having a non-linear spring constant.

8. The radiation imaging system according to claim 7, wherein the spring member comprises an inconstant-pitch compression coiled spring.

9. The radiation imaging system according to claim 7, wherein the spring member comprises a conical compression coiled spring.

10. The radiation imaging system according to claim 1, wherein the cushioning material comprises a radiation-transmissive member.

11. A radiation imaging system according to claim 1, wherein the radiation image detection panel comprises a fluorescent material and photoelectric conversion elements.

12. A radiation imaging system comprising:
    a radiation image detection panel having radiation detectors for converting radiation into electrical signals, disposed two-dimensionally in a radiation image detection area;
    an outer enclosure which holds therein the radiation image detection panel; and
    a cushioning material provided between the radiation image detection panel on a radiation-incident side and the outer enclosure,
    wherein the cushioning material covers the radiation image detection area.

13. The radiation imaging system according to claim 12, wherein the radiation image detection panel comprises a fluorescent material and photoelectric conversion elements.

* * * * *